(12) United States Patent
Ohanian

(10) Patent No.: US 12,171,284 B2
(45) Date of Patent: Dec. 24, 2024

(54) AERODYNAMIC CLOTHING AND ACCESSORY FOR BICYCLE RIDER

(71) Applicant: Ara Ohanian, Doravill, GA (US)

(72) Inventor: Ara Ohanian, Doravill, GA (US)

( * ) Notice: Subject to any disclaimer, the term of this patent is extended or adjusted under 35 U.S.C. 154(b) by 124 days.

(21) Appl. No.: 17/969,761

(22) Filed: Oct. 20, 2022

(65) Prior Publication Data

US 2023/0127286 A1  Apr. 27, 2023

Related U.S. Application Data

(60) Provisional application No. 63/270,076, filed on Oct. 21, 2021.

(51) Int. Cl.
*A41D 13/00* (2006.01)

(52) U.S. Cl.
CPC .... *A41D 13/0015* (2013.01); *A41D 2600/104* (2013.01)

(58) Field of Classification Search
CPC .......... A41D 13/0015; A41D 2600/104; A41D 2400/24
See application file for complete search history.

(56) References Cited

U.S. PATENT DOCUMENTS

| | | | | |
|---|---|---|---|---|
| 5,106,331 | A * | 4/1992 | Lizarazu | B63B 32/22 441/74 |
| 5,371,903 | A * | 12/1994 | Lew | A41D 13/00 2/88 |
| 6,438,755 | B1 * | 8/2002 | MacDonald | A41D 13/0015 2/69 |
| 11,160,318 | B2 * | 11/2021 | Neves | A41D 31/00 |
| 11,160,710 | B1 * | 11/2021 | Augustine | G16H 20/17 |
| 2018/0273127 | A1 * | 9/2018 | Konradi | B62J 9/23 |

FOREIGN PATENT DOCUMENTS

| | | | | |
|---|---|---|---|---|
| DE | 102016003241 | A1 * | 9/2017 | ............... A41D 3/06 |
| EP | 2952111 | A1 * | 12/2015 | ............... A41D 1/04 |
| EP | 3928650 | A1 * | 12/2021 | ......... A41D 13/0015 |
| JP | H02131517 | U | 11/1990 | |
| JP | H0612420 | U | 2/1994 | |
| WO | WO-2005099497 | A1 * | 10/2005 | ......... A41D 13/0015 |
| WO | WO-2011146387 | A1 * | 11/2011 | ......... A41D 13/0002 |

* cited by examiner

*Primary Examiner* — Tajash D Patel
(74) *Attorney, Agent, or Firm* — Jose Cherson Weissbrot

(57) ABSTRACT

The present invention discloses an aerodynamic clothing for a bicycle includes a body portion. The aerodynamic clothing also includes a tail portion outwardly extending towards the back of the bicycle. The tail portion is coupled to a bottom end of the body portion using a plurality of securing means. The tail portion being hooked onto an adjustable subframe having an adjustment means configured to secure the extension of the adjustable subframe. The aerodynamic clothing comprises a hook portion attached to a rear side of the subframe for holding the body portion, the hook portion being aligned at the predefined position. The aerodynamic clothing includes a hoodie member attached to a top end of the body portion using the plurality of securing means. The aerodynamic clothing also includes a shield portion present on each side of the shoulder being held by fingers aerodynamically for guiding air flow.

17 Claims, 8 Drawing Sheets

AERODYNAMIC CLOTHING AND ACCESSORY FOR BICYCLE RIDER

CROSS REFERENCE TO RELATED APPLICATIONS

This application claims priority under 35 United States Code, Section 119 from the provisional application No. 63/270,076 filed on Oct. 21, 2021, the disclosures of which are incorporated by reference.

FIELD OF THE DISCLOSURE

The present invention relates to aerodynamic clothing for a rider of a bicycle. More particularly, the present invention relates to a bicycle shirt that is aerodynamically optimized for bicycle racing and a clothing accessory that obtains an aerodynamic posture across the bicycle shirt.

BACKGROUND OF THE DISCLOSURE

Aerodynamic 'drag' is recognized as a main source of resistance in cycling. As a result, the bulk of modern bicycles and cyclist postures have been tuned to be more aerodynamic.

An aerodynamic clothing is intended for use by recreational, mountain, touring or racing bicyclists.

The aerodynamic clothing improves the rider's aerodynamic efficiency when riding into headwinds or against crosswinds and provides additional propulsion to drive the vehicle and rider in crosswinds or tailwinds.

Alternative to enhance the aero-dynamic efficiency of the rider and bicycle, devices such as aero handlebars, aero frames, aero wheels, aero brakes, aero cable routing, aero helmets, aero skin suits and the like have been developed. Conventionally, streamline helmets or other such devices used single handedly cannot minimize the turbulence and negative pressure created by the neck and throat when the rider is in the horizontal speed position. Below are some examples of aerodynamic clothing with accessories:

EP3928650A1 discloses an accessory garment comprising in at least one zone at least one aerodynamic accessory which is configured to improve the aerodynamic behavior of the person wearing the garment and which is configured to be removably associated with said zone, in correspondence with said at least one zone, said garment comprises an underlying first magnetic element, a substantially laminar portion which is positioned externally and above said first magnetic element, and also wherein said aerodynamic accessory is positioned/positioned externally and above said portion with substantially laminar development and comprises at least a second magnetic element, configured to magnetically engage with said underlying first magnetic element, to thus fix/constrain the accessory to the underlying first magnetic element above said portion with a substantially laminar development.

JPH02131517U discloses a solution with a padded element which is associated exclusively by means of hooking means of the Velcro type on a motorcycle suit. Male-type hooking means, for example hook-like, are provided on the padded element, which are intended to engage with female-type ring hooking means which are provided on the suit.

JPH0612420U discloses a rider wear that wears a helmet and rider wear to prevent deterioration of running performance due to turbulence behind the head during high-speed running in a prone posture and to improve safety. As a shape to fill the cavity drawn by the air streamline in the upper occipital region in a prone position while wearing a helmet and rider wear while running at high speed, it is configured with an air rectifying member at the lower back neck. Further, the rider wear for motorcycles, etc., characterized in that the air rectifying member is formed separately and is detachably attached.

Accordingly, there exists a need to overcome shortcomings of the conventional aerodynamics clothing and accessory. The object of the present invention is to propose the aerodynamic clothing that helps in achieving higher speed at the same propelling force.

SUMMARY OF THE DISCLOSURE

In view of the foregoing disadvantages inherent in the prior art, the general purpose of the present disclosure is to provide an aerodynamic clothing, to include all advantages of the prior art, and to overcome the drawbacks inherent in the prior art.

The main object of the present invention is to provide an aerodynamic clothing that allows faster speed while using the same force during the bicycle racing.

Another object of the present invention is to overcome drag caused by the wind especially during bicycling.

Yet another object of the present invention is to provide an aerodynamic clothing accessory to obtain an adjustable aerodynamic posture across the aerodynamic clothes.

Still another object of the present invention is to provide a hoodie member and a shield portion in aerodynamic clothing to create a sharp edge between the head and shoulders of rider for making the shoulders of the rider aerodynamic by streamlining.

In view of the above objects, embodiments in accordance with the present invention, an aerodynamic clothing and accessory for a rider of a bicycle is provided.

In a main embodiment, the present invention provides an aerodynamic clothing for a rider of a bicycle. The aerodynamic clothing comprises a body portion and a tail portion. The body portion is configured to be worn by the rider of the bicycle. It has a top portion and a bottom portion. The tail portion is coupled to the body portion and along a back of the bicycle. The tail portion comprises a front part and a rear part. The front part of the tail portion is coupled to a bottom portion of the body portion through a plurality of first securing means and the rear part of the tail portion is configured to extend outwardly towards the back of the bicycle and be coupled to the back of the bicycle to obtain an adjustable aerodynamic posture extending from the top portion of the body portion to the rear part of the tail portion.

In yet another embodiment, the present invention provides an aerodynamic clothing for rider of a bicycle. The aerodynamic clothing comprises a body portion and a tail portion. The body portion is configured to be worn by the rider of the bicycle. It has a top portion and a bottom portion. The tail portion is coupled to the body portion and along a back of the bicycle. The tail portion comprises a front part and a rear part. The front part of the tail portion is coupled to a bottom portion of the body portion through a plurality of first securing means and the rear part of the tail portion is configured to extend outwardly towards the back of the bicycle and be coupled to the back of the bicycle to obtain an adjustable aerodynamic posture extending from the top portion of the body portion to the rear part of the tail portion. The aerodynamic clothing further comprises a hoodie member attached to the top portion of the body portion through a plurality of second securing means. The hoodie member comprises a supporting element inserted inside the body portion and proximate to head of the rider. The supporting element is configured to extend diagonally between the head and the shoulders of the rider to create a sharp edge between the head and shoulders for making shoulders aerodynamic. The hoodie member further comprises a plurality of inserting means inserted to shape the sharp edge of the shoulders to be sharper.

In yet another embodiment, the present invention provides an aerodynamic clothing accessory for a rider of a bicycle. The aerodynamic clothing comprises a body portion and a tail portion and the aerodynamic clothing accessory comprises an adjustable subframe. The body portion is configured to be worn by the rider of the bicycle. It has a top portion and a bottom portion. The tail portion is coupled to the body portion and along a back of the bicycle. The tail portion comprises a front part and a rear part. The front part of the tail portion is coupled to a bottom portion of the body portion through a plurality of first securing means and the rear part of the tail portion is configured to extend outwardly towards the back of the bicycle and be coupled to the back of the bicycle subframe to obtain an adjustable aerodynamic posture extending from the top portion of the body portion to the rear part of the tail portion. An adjustable subframe coupled to the back of the bicycle to obtain an adjustable aerodynamic posture extending from the top portion of the body portion to the rear part of the tail portion. The adjustable subframe comprises an inner tube and a hollow outer tube. The inner tube has a first end and a second end opposite to the first end. The hollow outer tube has a proximal end and a distal end opposite to the proximal end. The hollow outer tube from the proximal end, slideably and telescopically receives the inner tube from the first end, to be adjusted lengthwise. The inner tube has a plurality of first holes along its length and the hollow outer tube has a plurality of second holes along its length. A plurality of adjustment means is inserted inside the plurality of first holes and the plurality of second holes based on concentricity of the plurality of first holes and the plurality of second holes and is configured to lock the adjustable subframe to a specific length. A coupling attachment is coupled to the distal end of the hollow outer tube. The coupling attachment is configured to couple the adjustable subframe to the back of the bicycle. An engaging attachment is coupled to the second end of the inner tube to engage with the rear part of the tail portion to obtain the adjustable aerodynamic posture extending from the top portion of the body portion to the rear part of the tail portion.

In another embodiment, the aerodynamic clothing further comprises a pair of shield portion coupled to the body portion and proximate to the hoodie member. The pair of shield portion is present on each side of shoulder of the rider. The shield portion extends towards arms of the rider and is attached to the body portion through a plurality of third securing means. The shield portion includes a plurality of slots to slide the fingers of the rider inside the plurality of slots. The shield portion is held by the fingers of the rider to provide an aerodynamic profile between the shoulder and hand of the rider for guiding air flow.

In one embodiment of the present disclosure, the hook (Subframe) portion may be aligned at the predefined positions comprising, a horizontal position, a vertical position, and so forth. The hook portion when aligned in horizontal position forms T-shaped hook. The hook portion when aligned in vertical position forms L-shaped hook. The aerodynamic clothing may comprise a cable latch that may unhook the tail portion from the T-shaped hook.

This together with the other aspects of the present disclosure, along with the various features of novelty that characterize the present disclosure, is pointed out with particularity in the claims annexed hereto and forms a part of the present disclosure. For a better understanding of the present disclosure, its operating advantages, and the specified object attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will become better understood with reference to the following detailed description taken in conjunction with the accompanying drawing, in which.

Like reference numerals refer to like parts throughout the description of several views of the drawing.

DETAILED DESCRIPTION OF THE DISCLOSURE

The exemplary embodiments described herein detail for illustrative purposes are subject to many variations in implementation. The present disclosure provides an aerodynamic clothing for bicycle. It should be emphasized, however, that the present disclosure is not limited only to what is disclosed and extends to cover various alternation to the aerodynamic clothing for bicycle. It is understood that various omissions and substitutions of equivalents are contemplated as circumstances may suggest or render expedient, but these are intended to cover the application or implementation without departing from the spirit or scope of the present disclosure.

The terms "a" and "an" herein do not denote a limitation of quantity, but rather denote the presence of at least one of the referenced items.

The terms "having", "comprising", "including", and variations thereof signify the presence of a component.

The present invention discloses an aerodynamic clothing that may cover a rider's torso and may contain aerodynamically enhanced elements that reduces the rider's aerodynamic drag, especially when the rider is in an aerodynamic posture on a bicycle. Riders participating in other high-speed sports, such as speed skating and skiing, may take advantage from the aerodynamic clothing disclosed in the present invention. Further, the aerodynamic clothing may let the cyclist perform significantly better aerodynamically and produce far less drag by covering nearly every region of the torso.

Figure 1:
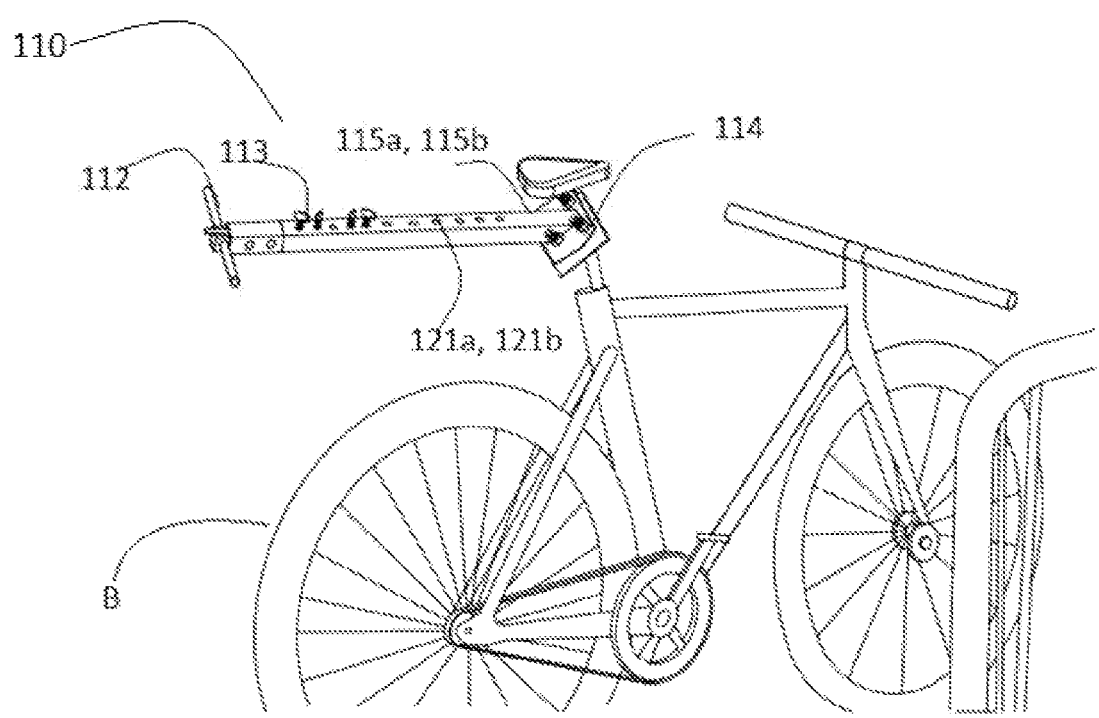
FIG. 1 illustrates a cycling arrangement having an adjustable subframe coupled to bicycle, according to embodiments of the present invention disclosed herein.
Figure 2A:
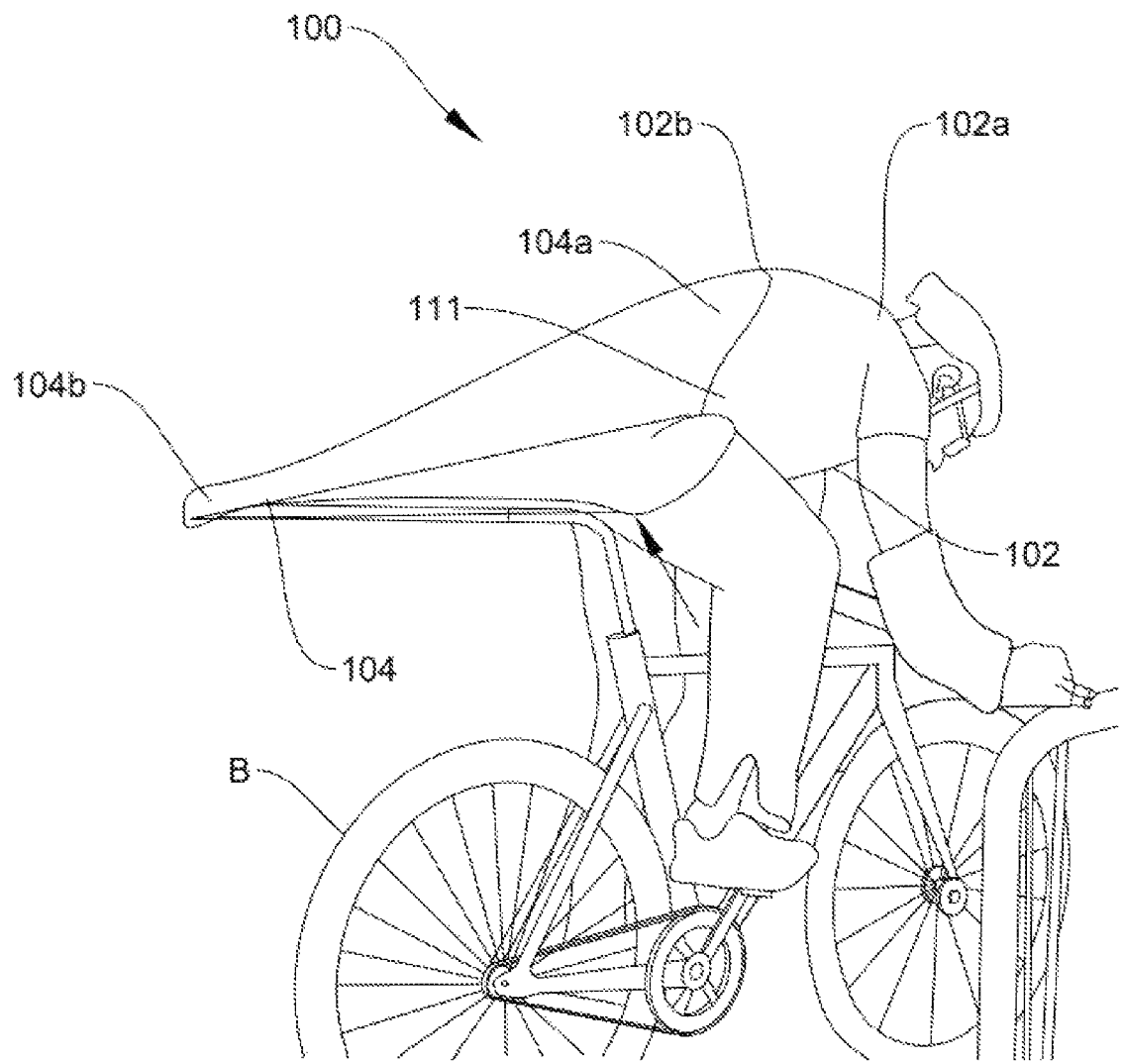
FIG. 2a illustrates a side view of a rider wearing an aerodynamic clothing, according to embodiments of the present invention disclosed herein.
Figure 2B:
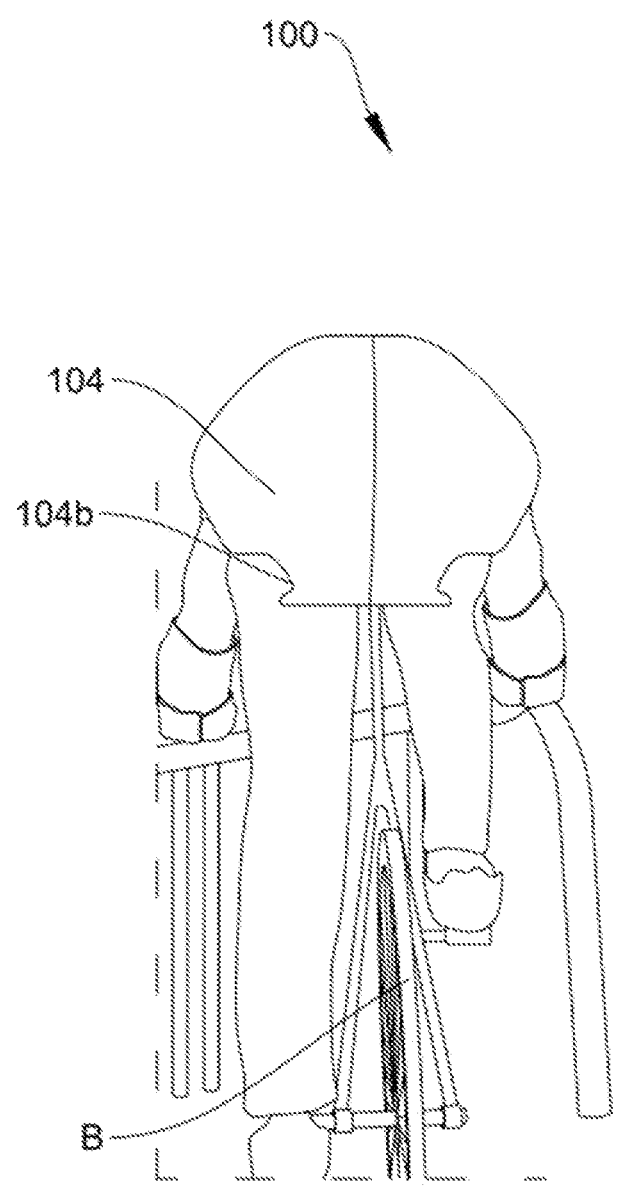
FIG. 2b illustrates a back view of a rider wearing an aerodynamic clothing, according to embodiments of the present invention disclosed herein.

An aerodynamic clothing 100 for a rider of a bicycle will now be described in conjunction with FIGS. 1 to 5, in accordance with various embodiments of the present disclosure. FIG. 1 illustrates a cycling arrangement having an adjustable subframe 110 coupled to the bicycle. FIGS. 2a and 2b illustrates a side view of a rider wearing an aerodynamic clothing 100 without a hoodie member 106 and a shield portion 108. Referring now to FIGS. 1 to 5, various views, and components of the aerodynamic clothing 100 and accessory for the bicycle and the rider are shown and will now be described in conjunction to all the FIGS. 1 to 5.

The aerodynamic clothing 100 for a rider of a bicycle may comprise a body portion 102, a tail portion 104, a hoodie member 106 and a shield portion 108, according to embodiments of the present invention.

As seen particularly in FIG. 1, the cycling arrangement has an adjustable subframe 110 coupled to the bicycle "B" seat rail. The details of the adjustable subframe 110 has been explained in reference to FIG. 3a-3c later in the description.

As seen in FIGS. 2a and 2b, the aerodynamic clothing 100 is disclosed. The body portion 102 may be engaged with the tail portion 104 or that the tail portion 104 may extend from the body portion 102 as unitary part thereof. The body portion 102 is worn by the rider of the bicycle 13'. The body portion has a top portion 102a and a bottom portion 102b. The tail portion 104 is coupled to the body portion and along a back of the bicycle. The tail portion 104 includes a front part 104a and a rear part 104b. The front part 104a of the tail portion is coupled to the bottom portion 102b of the body portion 102 through a plurality of first securing means 111. The rear part 104b of the tail portion 104 extends outwardly towards the back of the bicycle B. The rear part 104b is also coupled to the back of the bicycle B to obtain an adjustable aerodynamic posture that extends from the top portion 102a of the body portion 102 to the rear portion 104b of the tail portion 104.

Figure 2C:
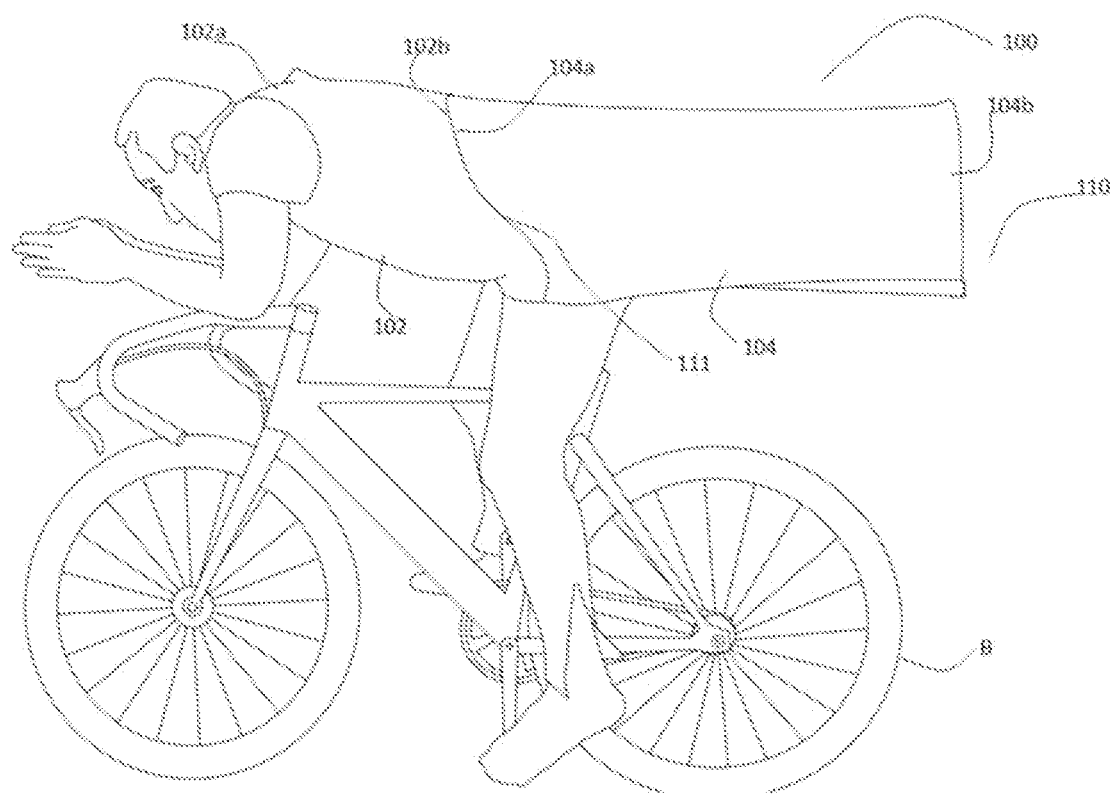
FIG. 2c illustrates a side view of a rider wearing an aerodynamic clothing, according to embodiments of the present invention disclosed herein.

As seen in FIG. 2c, the rider position is straight from head of the rider to the tail portion 104b with respect to the ground level. The rider position may be slightly inclined from the head of the rider to the tail portion 104b with respect to the ground level. This arrangement of aerodynamic clothing reduces the air resistance and reduces the drag.

The aerodynamic clothing 100 may comprise of a stretchable fabric reinforced on the top front portion of the body portion 102 and on the top rear portion of the body portion 102 to maximize the breathability and comfort. The aerodynamic clothing 100 may include a front quarter zipper for breathability with a pair of side pockets with zipper to store valuable items.

Hereinafter, the aerodynamic clothing 100 may refer to a suit, a long sleeve shirt, a short sleeve shirt, a sleeveless shirt with arm supporters, or a garment worn by the rider of the bicycle. The aerodynamic clothing 100 may be any existing garment already being worn by the rider. In another embodiment of the present invention the aerodynamic clothing 100 may be designed completely for overall coverage of the rider.

In example embodiments of the present invention, the plurality of first securing means 111 may be Velcro, or may be threads that are used for stitching the body portion 102 and the tail portion 104 together or may be other coupling means such as snap coupling to create streamlined airflow that reduces drag. The aerodynamic clothing 100 may further comprise a cable latch which may unhook the tail portion 104.

Figure 3A:
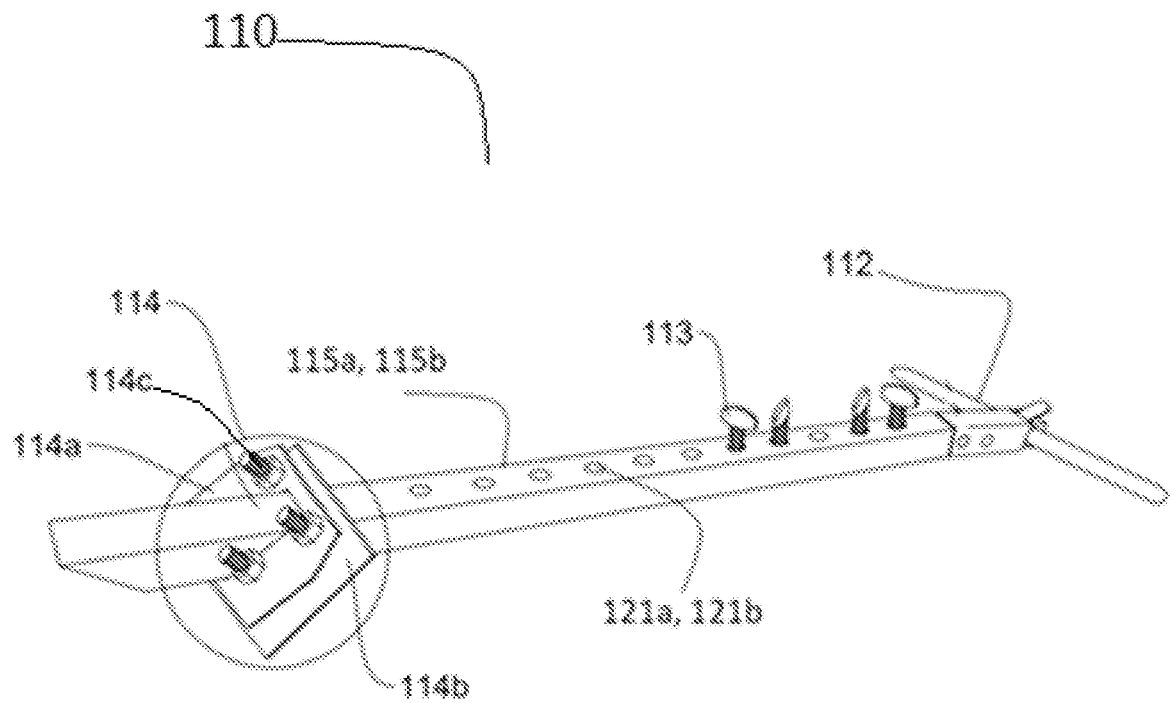
FIG. 3a illustrates a perspective view of the adjustable subframe in collapsed position, according to embodiments of the present invention disclosed herein.
Figure 3B:
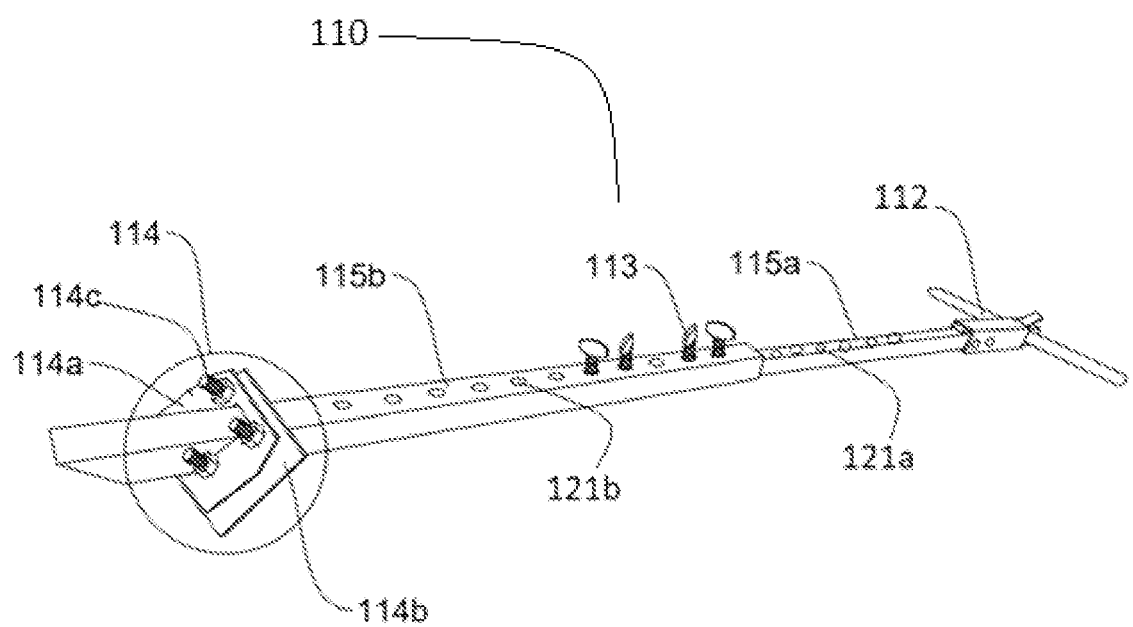
FIG. 3b illustrates a perspective view of the adjustable subframe in extended position, according to embodiments of the present invention disclosed herein.
Figure 3C:
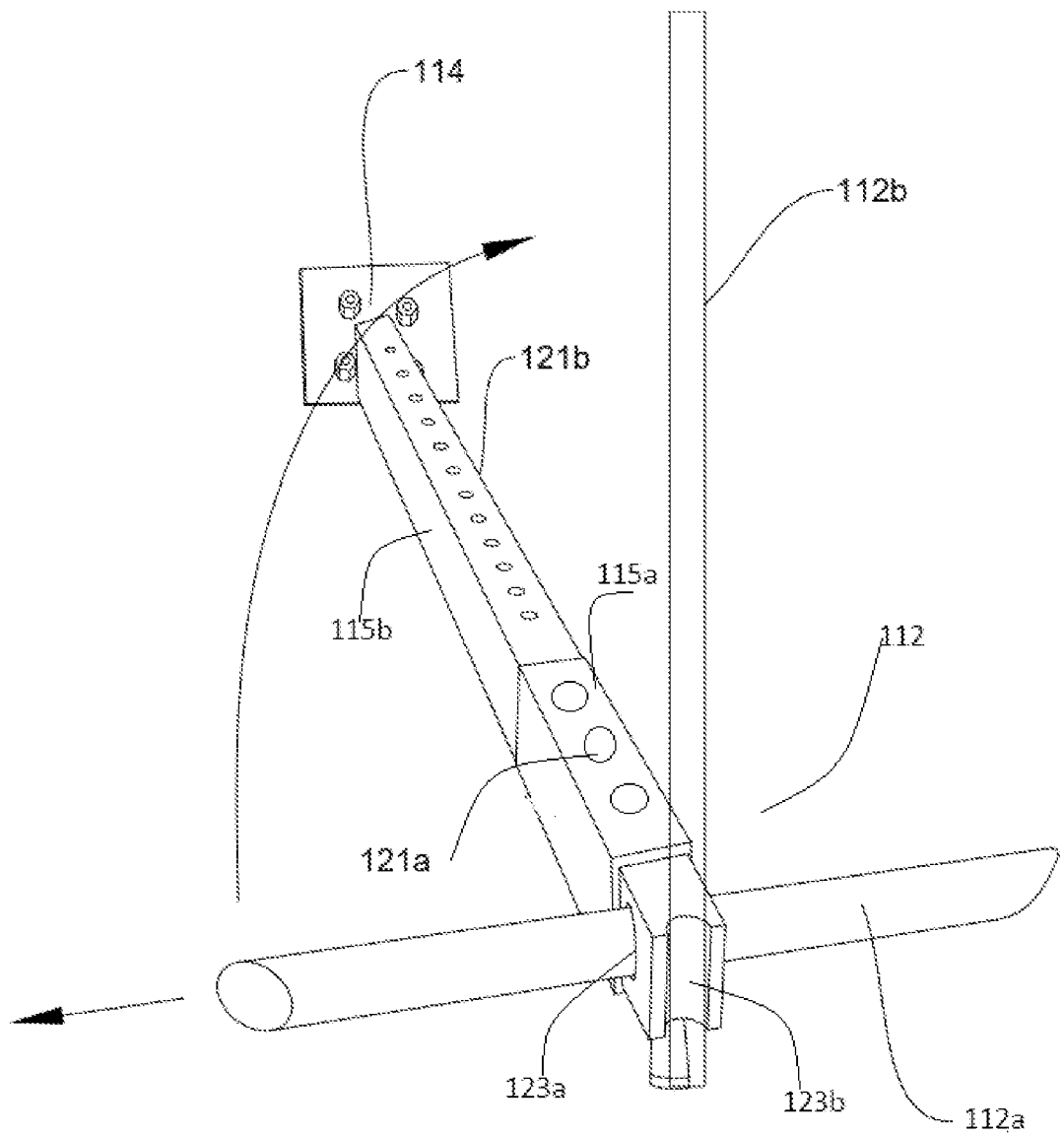
FIG. 3c illustrates a perspective view of the adjustable subframe aligned in horizontal position, according to embodiments of the present invention disclosed herein.

Referring to FIGS. 3a, 3b, and 3c, the present invention provides an adjustable subframe 110 in an extended and collapsed position. The adjustable subframe 110 is used to couple the tail portion 104 to the back of the bicycle "B" to obtain an adjustable aerodynamic posture extending from the top portion 102a of the body portion 102 to the rear part 104b of the tail portion 104. The adjustable subframe 110 includes an inner tube 115a and a hollow outer tube 115b. The inner tube 115a has a first end, and a second end opposite to the first end. The hollow outer tube 115b has a proximal end, and a distal end opposite to the proximal end. The hollow outer tube 115b, from the proximal end, slideably and telescopically receives the inner tube 115a from the first end, to be adjusted lengthwise. The inner tube 115a has a plurality of first holes 121a along its length and the hollow outer tube 115b has a plurality of second holes 121b along its length. The plurality of adjustment means 113 is inserted inside the plurality of first holes 121a and the plurality of second holes 121b based on concentricity of the plurality of first holes 121a and the plurality of second holes 121b. The plurality of adjustment means 113 is configured to lock the adjustable subframe 110 to a specific length. A coupling attachment 114 is coupled to the distal end of the hollow outer tube 115b. The coupling attachment 114 is configured to couple the adjustable subframe 110 to the back of the bicycle "B" and an engaging attachment 112 is coupled to the second end of the inner tube 115a to engage with the rear part 104b of the tail portion 104 to obtain the adjustable aerodynamic posture extending from the top portion 102a of the body portion 102 to the rear part 104b of the tail portion 104. Hereinafter, the inner tube 115a and outer tube 115b in combination may refer to a telescopic extension where the inner tube 115a and the outer tube 115b are telescopically and slideably coupled to each other.

The adjustable means 113 may comprise a plurality of thumb screws. The plurality of thumb screws may be configured to lock the adjustable subframe 110 into a desired length.

In another embodiment of the present invention, the adjustable means 113 may comprise a push button. The push button notching module may be present where the rider may hold the telescopic extension. The push button at the same time may slide the telescopic extension to desired length and then release of the push button may secure the desired length of the adjustable subframe 110. The adjustable means 113 may include or exclude further elements as per the requirements of the user and the overall system attachments.

Another design for such an extension may support the rider in doing so while riding the bicycle which would be achieved by having a design that allows rider to push backward or pull forward the telescopic extension from between his legs under the seat.

The adjustable subframe 110 may be attached to a part of the bicycle at a predefined position using the coupling attachment 114. The coupling attachment 114 may be a two-plates assembly. A first plate 114a of the two-plates assembly may be connected to the part of the bicycle at the predefined position and a second plate 114b of the two-plates assembly may be connected to the telescopic extension and to the first plate through a plurality of connecting parts 114c. In an exemplary embodiment, the coupling attachment 114 includes a welded flange which have the angle matching that of the seat rail and may be extended telescopically in increments and may be secured through the thumb screws. The welded flange may be connected to a rear portion of the seat rail with bolts. The rails may be usually angled approximately at approximately 45°. At least two welded flanges may be coupled to form a connecting sandwich to the seat rail at a predetermined angle. The predetermined angle may be 45° degrees. The connecting sandwich may be employed at 45° degrees to any part of the bicycle, as seen in FIGS. 3a and 3b.

The predefined position may comprise a horizontal position (like aeroplane wings), a vertical position (like aeroplane rudder), and so forth.

The tail portion 104 may be adapted to be fastened to the bicycle's adjustable subframe 110 utilizing the bicycle's Seat Rails, Seat Post, or Frame through the engaging attachment 112. The engaging attachment 112 comprises of a hook portion to hook the adjustable subframe 110 to the tail portion 104, and the hook portion is aligned in a specific direction. The adjustable subframe 110 may be customizable in length and material. The adjustable subframe 110 may potentially have a design variant that the rider may alter while riding. The rider may tie the shirt tail portion 104 onto the adjustable subframe 110 while the adjustable subframe 110 is in short (closer to the seat) position (less aerodynamic). Further, the rider may push the sliding adjustable subframe 110 backward with his/her hand from between his/her legs.

In one embodiment of the present invention, a rider may be allowed to push backward the telescopic extension from between his/her legs, under the seat. In another embodiment of the present invention, the rider may be allowed to pull forward the telescopic extension from between his/her legs, under the seat.

In one of the embodiments of the present invention, the adjustable subframe 110 may be an aluminum telescopic inner tube 115a within an outer tube 115b that can be extended up to, for example, 36 inches from the back of the seat progressively and may be secured with the help of thumb screws.

Furthermore, the engaging attachment 112 such as hook portion may be attached to a rear side of the adjustable subframe 110 for holding the body portion 102. The hook portion 112 may be aligned at the predefined position. The adjustable sub frame 110 may be made up of variant materials, but considering the utility, aluminium may be the most preferred material in the embodiment. The hook portion 112 may be made of a material comprising wood. In another embodiment of the present invention, the adjustable subframe 110 and the hook portion 112 may be made of a monolith material. The adjustable sub frame 110 may be extended up to 36 inches from the rear of the seat, further connected to the seat rails which may be angled at 45 degrees.

In one of the embodiments of the present invention, the adjustable subframe 110 may also have a design variation that may be adjusted by the rider while riding. The rider may connect the shirt tail portion 104 onto the adjustable subframe 110 when the adjustable subframe 110 is closer to a seat position and then push the adjustable subframe 110 backward with his hand from between his legs.

In an exemplary embodiment of the present invention, the inner tube 115a of the adjustable subframe 110 has a longitudinal slot 123b and a horizontal slot 123a. The longitudinal slot 123b and the horizontal slot 123a are adjacently disposed to each other. The hook portion 112 when incorporated in the longitudinal slot 123b forms the "L" shaped hook 112b and the hook portion 112 when incorporated in the horizontal slot 123a forms the "T" shaped hook 112a as seen in FIGS. 3b and 3c. The "T" shaped hook 112a is aligned in a horizontal position, as seen in FIGS. 3b and 3c. In another exemplary embodiment of the present invention, the "L" shaped hook 112b is aligned in a vertical position as seen in FIG. 3c The shirt may be hooked to the subframe's "T" shaped hook 112a. The aerodynamic clothing 100 may comprise a cable latch that may unhooks the tail portion 104 from the "T" shaped hook.

The "T" shaped hook may be approximately 8 inches long and may be positioned vertically or horizontally as shown in FIG. 3b. The adjustable sub frame 110 may be adjusted first, then rider mounts on the bicycle and then hook the hook portion 112 on the tail portion 104. After engaging the tail portion 104 in subframe's "T" shaped hook, the rider wears the hoodie member 106, as seen in FIG. 4.

The "T" shaped hook may be position as an "L" shape with the subframe like a rudder.

According to embodiments of the present invention, the hook portion 112 may be made of a material, such as, but not limited to, wood, plastic, metal, and so forth. Embodiments of the present invention are intended to include or otherwise cover any type of the material including known, related art, and/or later developed technologies.

Figure 4:
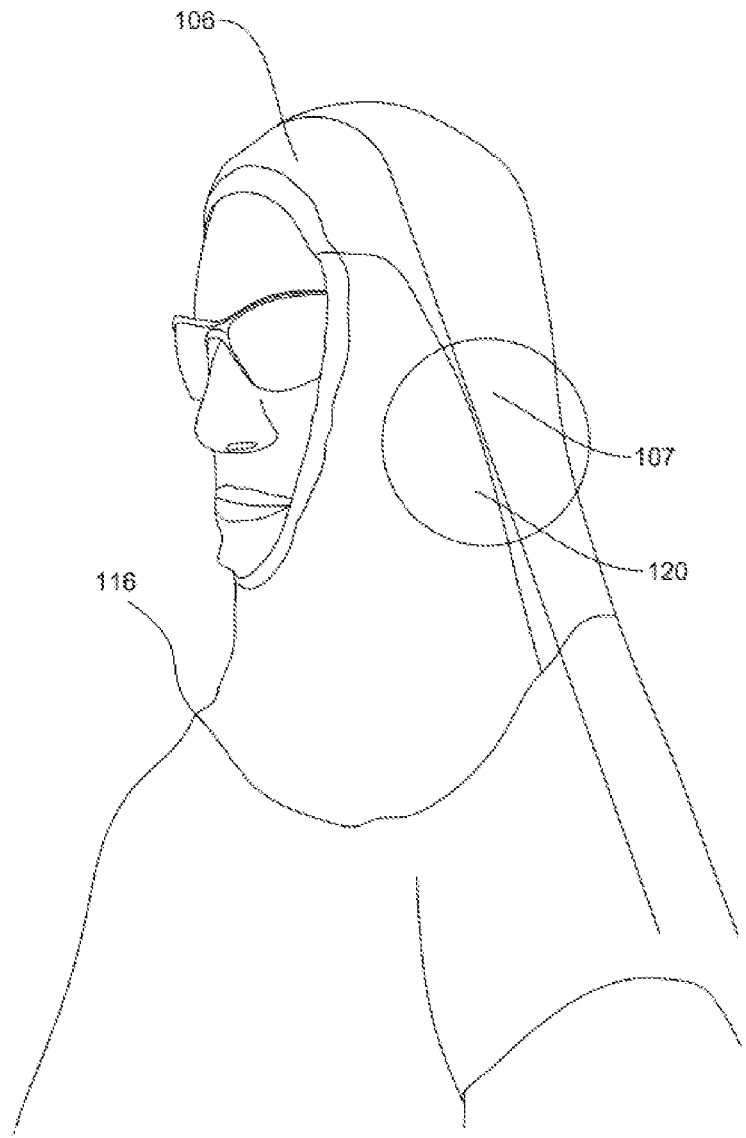
FIG. 4 illustrates a perspective view of a hoodie member, according to embodiments of the present invention disclosed herein.

Referring now to FIG. 4, the present invention provides a hoodie member 106. The hoodie member 106 is attached to the top portion 102a of the body portion 102 through a plurality of second securing means 116. The hoodie member 106 has a supporting element 107, inserted inside the body portion 102, proximate to head of the rider. The supporting element 107 is configured to extend diagonally between the head and the shoulders of the rider to create a sharp edge between the head and shoulders for making shoulders aerodynamic. The hoodie member 106 may be attached to a top end of the body portion 102 using a plurality of second securing means.

According to embodiments of the present invention, the second securing means may comprise, Velcro strips, snap button, hook and eye, button, zipper, and so forth. In one of the embodiments of the preset invention, the hoodie member 106 may be fixed to the shirt using a plurality of Velcro strips or via stitching or snapping. In another embodiment of the present invention, the hoodie member 106 may be sewn to any existing shirt.

The hoodie member 106 may be utilized while the rider is in the horizontal ('speed') position, to level out the negative pressure and turbulence caused by the rider's neck and throat and soften the area of the shoulders where there is a lot of negative pressure.

Moreover, the hoodie member 106 in combination with other components of the aerodynamic clothing 100 may reduce the overall drag. The hoodie member 106 overcomes the problems of streamline in helmets which do not streamline the shoulders or chin/throat area. The hoodie member 106 may prevent the air from hitting directly onto the shoulders and reduces the air from passing between the arms. The supporting element 107 may comprise a support string, a foam, and so forth. The supporting element is inserted inside the body portion 102 forms a sandwich between head and shoulder of the rider. The supporting element extends diagonally between the head and the shoulders of the rider to create a sharp edge between the head and shoulders for making shoulders aerodynamic. In an exemplary scenario, the hoodie member 106 may further comprise a plurality of inserting means 120. The inserting means 120 may be inserted to shape the leading edge of the shoulders to be sharper and to better cut the air.

According to embodiments of the present invention, the inserting means 120 may comprise foam, string, and so forth. Embodiments of the present invention are intended to include or otherwise cover any type of the inserting means 120 including known, related art, and/or later developed technologies. The inserting means 120 embedded in the hoodie member 106 may provide sharp edge to make shoulders more aerodynamic.

Further, the inserting means 120 may force the aerodynamic clothing 100 to take the aerodynamic shape. Also, the body portion 102 that may be stretchable in nature may also be a variation to the aerodynamic shape acquired.

A line shown in FIG. 4 may represent the sharp edge that may cut or separate the wind better. In one embodiment of the present invention, an organic shape of the body portion 102 having a stretched fabric may be protected by not changing the shape formed by added the inserting means 120.

Figure 5:
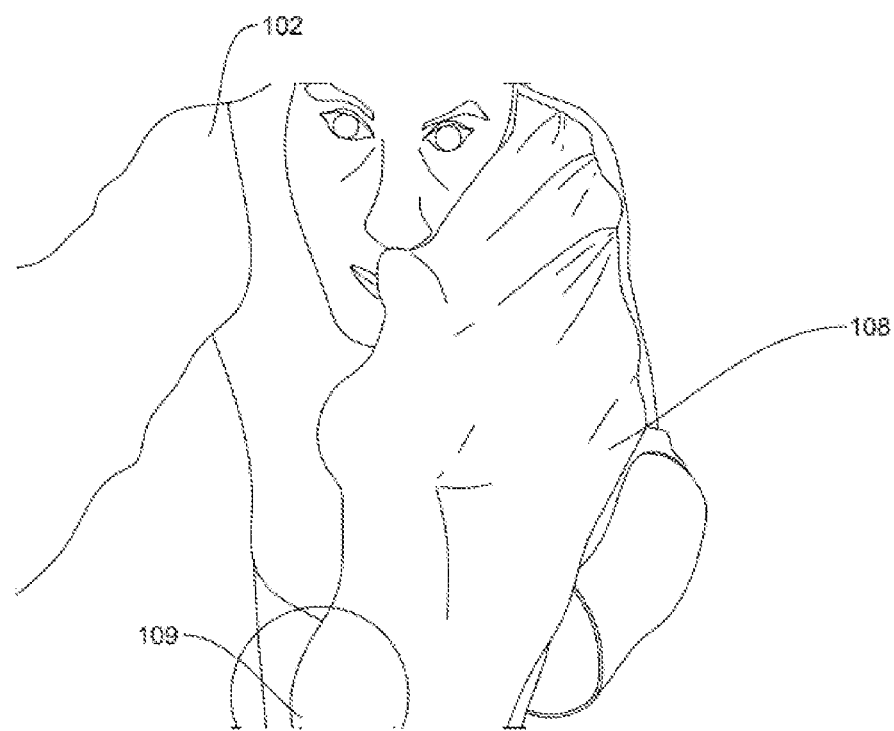
FIG. 5 illustrates a front view of a shield portion, according to embodiments of the present invention disclosed herein.

Referring now to FIG. 5 that illustrates a pair of shield portion 108 that may be present on each side of the shoulder. The pair of shield portion 108 is coupled to the body portion 102, proximate to the hoodie member 106, on each side of shoulder. The shield portion 108 is attached to the body portion 102 through a plurality of third securing means. The shield portion 108 includes a plurality of slots 109 to slide the fingers of the rider inside the plurality of slots 109 and the shield portion 108 is held by the fingers of the rider to provide an aerodynamic profile between the shoulder and hand of the rider for guiding air flow. The shield portion 108 may be an arm fairing that may be utilized for the purpose of diverting the air around the rider like a wind shield member. The shield portion 108 may be connected to the body portion 102 or the hoodie member 106.

According to embodiments of the present invention, the first securing means 111 is used to couple the body portion 102 to the tail portion 104. The second securing means 116 is used to couple the hoodie member to the body portion 102 and the third securing means is used to couple the shield portion 108 to the body portion 102. The first securing means 111, the second securing means 116 and the third securing means may comprise, Velcro strips, snap button, hook and eye, safety pins, button, zipper, push buttons, and so forth. Embodiments of the present invention are intended to include or otherwise cover any type of the securing means including known, related art, and/or later developed technologies.

The shield portion 108 may keep the air from getting between the rider's arms and into his or her lap. The shield portion 108 may force air to circulate around the rider's torso. Moreover, the shield portion 108 may be made of a fabric. In preferred embodiments of the present invention, the arm fairing may be connected to shirts or just long sleeves worn independently which in speed position will guide the airflow out of rider's lap and around his torso. Hence, the shield portion 108 may reduce the air between the arms of the rider.

In one embodiment of the present disclosure, the aerodynamic clothing may include a cable latch that may unhook the tail portion from the T-shaped hook. One end of the cable latch may be connected to the hook portion 112a or 112b through thumb screws 113 and other end of the cable latch may be connected to the hand grip of the bicycle or seat grip of the bicycle so that the rider may easily unhook the tail portion 104b from the hook portion 112a or 112b while riding to lower the tail portion 104b when required.

In preferred embodiments, the arm fairing may prevent the air from hitting the shoulders, the arm fairing also reduces the air that passes between the arms of the rider in the speed (Horizontal) position.

Such aerodynamic profile of the clothing results in various scientific verbiage relating to aerodynamics, such as NACA Profile, Roynolds Number, Boundary layer, Skin friction drag, Drag coefficient, Bernoulli's equation, and so forth.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present disclosure.

What is claimed is:

1. An aerodynamic clothing for a rider of a bicycle, the aerodynamic clothing comprising:
    a body portion configures to be worn by the rider of the bicycle, the body portion having a top portion and a bottom portion; and
    a tail portion coupled to the body portion and along a back of the bicycle, the tail portion comprises a front part and a rear part,
    wherein the front part of the tail portion is coupled to the bottom portion of the body portion through a plurality of first securing means, and
    wherein the rear part of the tail portion is configured to extend outwardly towards the back of the bicycle and be coupled to the back of the bicycle to be adjusted via an adjustable subframe to obtain an adjustable aerodynamic posture extending from the top portion of the body portion to the rear part of the tail portion.

2. The aerodynamic clothing according to claim 1, wherein the adjustable subframe comprises:
    an inner tube having a first end, and a second end opposite to the first end;
    a hollow outer tube having a proximal end, and a distal end opposite to the proximal end, the hollow outer tube, from the proximal end, slideably and telescopically receives the inner tube from the first end, to be adjusted lengthwise;
    the inner tube has a plurality of first holes along its length and the hollow outer tube has a plurality of second holes along its length;
    a plurality of adjustment means inserted inside the plurality of first holes and the plurality of second holes based on concentricity of the plurality of first holes and the plurality of second holes and is configured to lock the adjustable subframe to a specific length;
    a coupling attachment coupled to the distal end of the hollow outer tube, wherein the coupling attachment is configured to couple the adjustable subframe to the back of the bicycle; and
    an engaging attachment coupled to the second end of the inner tube to engage with the rear part of the tail portion to obtain the adjustable aerodynamic posture extending from the top portion of the body portion to the rear part of the tail portion.

3. The aerodynamic clothing according to claim 2, wherein
the coupling attachment comprises a plurality of connecting parts to couple the adjustable subframe to the back of the bicycle, and
the plurality of connecting parts is connected with back of seat of the bicycle.

4. The aerodynamic clothing according to claim 2, wherein
the engaging attachment comprises of a hook portion to hook the adjustable subframe to the tail portion, and
the hook portion is aligned in a specific direction.

5. The aerodynamic clothing according to claim 1, further comprising a hoodie member attached to the top portion of the body portion through a plurality of second securing means, the hoodie member having:
a supporting element, inserted inside the body portion, proximate to head of the rider, configured to extend diagonally between the head and the shoulders of the rider to create a sharp edge between the head and shoulders for making shoulders aerodynamic.

6. The aerodynamic clothing according to claim 5, wherein the hoodie member further comprises a plurality of inserting means inserted to shape the sharp edge of the shoulders to be sharper.

7. The aerodynamic clothing according to claim 5, further comprising:
a pair of shield portion coupled to the body portion, proximate to the hoodie member, on each side of shoulder, the pair of shield portion configured for being held by the fingers of the rider to provide an aerodynamic profile between the shoulder and hand of the rider for guiding air flow.

8. The aerodynamic clothing according to claim 1, wherein the aerodynamic clothing further comprises a stretchable fabric reinforced on the top front portion of the body portion and on the top rear portion of the body portion, and
the stretchable fabric is configured to maximize breathability and comfort.

9. The aerodynamic clothing according to claim 1, wherein
the top portion of the body portion has a front quarter zipper for breathability, and
the aerodynamic clothing has a pair of side pockets with zipper to store valuable items.

10. An aerodynamic clothing for a rider of a bicycle, the aerodynamic clothing comprising:
a body portion configures to be worn by the rider of the bicycle, the body portion having a top portion and a bottom portion;
a tail portion coupled to the body portion and along a back of the bicycle, the tail portion comprises a front part and a rear part, wherein the front part of the tail portion is coupled to a bottom portion of the body portion through a plurality of first securing means, and wherein the rear part of the tail portion is configured to extend outwardly towards the back of the bicycle and be coupled to the back of the bicycle to be adjusted via an adjustable subframe to obtain an adjustable aerodynamic posture extending from the top portion of the body portion to the rear part of the tail portion; and
a hoodie member attached to the top portion of the body portion through a plurality of second securing means,
wherein the hoodie member comprises a supporting element, inserted inside the body portion, proximate to head of the rider, configured to extend diagonally between the head and the shoulders of the rider to create a sharp edge between the head and shoulders for making shoulders aerodynamic, and the hoodie member further comprises a plurality of inserting means inserted to shape the sharp edge of the shoulders to be sharper.

11. The aerodynamic clothing according to claim 10, a pair of shield portion is coupled to the body portion, proximate to the hoodie member, on each side of shoulder of the rider and extends towards arms of the rider, is attached to the body portion through a plurality of third securing means, wherein
the shield portion includes a plurality of slots to slide the fingers of the rider inside the plurality of slots, and
the shield portion is held by the fingers of the rider to provide an aerodynamic profile between the shoulder and hand of the rider for guiding air flow.

12. The aerodynamic clothing according to claim 10, wherein
the adjustable subframe comprises:
an inner tube having a first end, and a second end opposite to the first end;
a hollow outer tube having a proximal end, and a distal end opposite to the proximal end, the hollow outer tube, from the proximal end, slideably and telescopically receives the inner tube from the first end, to be adjusted lengthwise;
the inner tube has a plurality of first holes along its length and the hollow outer tube has a plurality of second holes along its length;
a plurality of adjustment means inserted inside the plurality of first holes and the plurality of second holes based on concentricity of the plurality of first holes and the plurality of second holes and is configured to lock the adjustable subframe to a specific length;
a coupling attachment coupled to the distal end of the hollow outer tube, wherein the coupling attachment is configured to couple the adjustable subframe to the back of the bicycle; and
an engaging attachment coupled to the second end of the inner tube to engage with the rear part of the tail portion to obtain the adjustable aerodynamic posture extending from the top portion of the body portion to the rear part of the tail portion.

13. An aerodynamic clothing accessory for a rider of a bicycle, comprising:
the aerodynamic clothing comprises:
a body portion configures to be worn by the rider of the bicycle, the body portion having a top portion and a bottom portion,
a tail portion, coupled to the body portion and along a back of the bicycle,
the tail portion comprises a front part and a rear part,
wherein the front part of the tail portion is coupled to a bottom portion of the body portion through a plurality of first securing means,
and
wherein the rear part of the tail portion is configured to extend outwardly towards a back of the bicycle and be coupled to the back of the bicycle to be adjusted via an adjustable subframe to obtain an adjustable aerodynamic posture extending from the top portion of the body portion to the rear part of the tail portion; and
wherein the adjustable subframe comprises:

an inner tube having a first end, and a second end opposite to the first end, a hollow outer tube having a proximal end, and a distal end opposite to the proximal end, the hollow outer tube, from the proximal end, slideably and telescopically receives the inner tube from the first end, to be adjusted lengthwise, the inner tube has a plurality of first holes along its length and the hollow outer tube has a plurality of second holes along its length;

a plurality of adjustment means inserted inside the plurality of first holes and the plurality of second holes based on concentricity of the plurality of first holes and the plurality of second holes and is configured to lock the adjustable subframe to a specific length;

a coupling attachment coupled to the distal end of the hollow outer tube, wherein the coupling attachment is configured to couple the adjustable subframe to the back of the bicycle, and an engaging attachment coupled to the second end of the inner tube to engage with the rear part of the tail portion to obtain the adjustable aerodynamic posture extending from the top portion of the body portion to the rear part of the tail portion.

14. The aerodynamic clothing accessory according to claim 13, wherein the coupling attachment comprises a plurality of connecting parts to couple the adjustable subframe to the back of the bicycle, and the plurality of connecting parts is connected with back of seat rails of the bicycle.

15. The aerodynamic clothing accessory according to claim 13, wherein the engaging attachment comprises of a hook portion to hook the adjustable subframe to the tail portion, and the hook portion is aligned in a specific direction.

16. The aerodynamic clothing accessory according to claim 13, further comprising:

a hoodie member attached to the top portion of the body portion through a plurality of second securing means, the hoodie member having:

a supporting element, inserted inside the body portion, proximate to head of the rider, configured to extend diagonally between the head and the shoulders of the rider to create a sharp edge between the head and shoulders for making shoulders aerodynamic.

17. The aerodynamic clothing accessory according to claim 13, further comprising:

a pair of shield portion coupled to the body portion, proximate to the hoodie member, on each side of shoulder, the pair of shield portion configured for being held by the fingers of the rider to provide an aerodynamic profile between the shoulder and hand of the rider for guiding air flow.

\* \* \* \* \*